US007610675B2

(12) United States Patent
Hansson et al.

(10) Patent No.: US 7,610,675 B2
(45) Date of Patent: Nov. 3, 2009

(54) METHOD TO PRODUCE A TRANSPONDER

(75) Inventors: Fredrik Hansson, Karlskrona (SE); Mattias Persson, Ronneby (SE)

(73) Assignee: Assa Abloy AB (CH)

( * ) Notice: Subject to any disclaimer, the term of this patent is extended or adjusted under 35 U.S.C. 154(b) by 424 days.

(21) Appl. No.: 10/831,209

(22) Filed: Apr. 26, 2004

(65) Prior Publication Data

US 2004/0211058 A1 Oct. 28, 2004

(30) Foreign Application Priority Data

Apr. 25, 2003 (EP) .................................. 03009450

(51) Int. Cl.
*H04B 1/59* (2006.01)
*H01R 43/02* (2006.01)

(52) U.S. Cl. ............................ 29/606; 29/843; 29/860; 367/2; 242/548.3

(58) Field of Classification Search ................... 29/606, 29/602.1, 840, 843, 860, 600, 601; 228/4.5, 228/45, 180.5; 367/2; 242/128, 548.3
See application file for complete search history.

(56) References Cited

U.S. PATENT DOCUMENTS 4,860,433 A * 8/1989 Miura ...................... 29/840 X
5,572,410 A 11/1996 Gustafson
5,634,261 A 6/1997 Gustafson

FOREIGN PATENT DOCUMENTS

| | | | |
|---|---|---|---|
| DE | 43 07 080 | 9/1994 | |
| JP | 54-152962 | * 12/1979 | ............... 228/45 X |
| JP | 55044474 A | * 3/1980 | ................. 242/128 |
| WO | WO 93/09551 | 3/1993 | |

OTHER PUBLICATIONS

Finn, D., "Method and Device for Producing a Coil Arrangement", pp. 1-59, Certified English Translation of WO 93/09551.*

* cited by examiner

*Primary Examiner*—A. Dexter Tugbang
(74) *Attorney, Agent, or Firm*—Sheridan Ross P.C.

(57) ABSTRACT

A method to produce a transponder comprises the steps of positioning a coil comprising at least one coil end in a predetermined coil position and holding all of said coil ends in a respective holding position, and holding a chip comprising at least one contact pad in a chip fixture so that all of said coil ends of the coil that should be bonded to said chip are located on one side of corresponding contact pads of the chip, and bonding of the coil ends to the contact pads.

3 Claims, 7 Drawing Sheets

METHOD TO PRODUCE A TRANSPONDER

CROSS-REFERENCE TO RELATED APPLICATION

This application claims the priority of European Patent Application No. 03 009 450.2, filed on Apr. 25, 2003, the subject matter of which is incorporated herein by reference.

BACKGROUND OF THE INVENTION

The present invention relates to a method and a device for producing a transponder, and to a transponder itself that comprises an integrated circuit chip and a coil, wherein the chip and the winding of the coil are positioned approximately in the same plane.

Certain problems are appearing at the time of making such components, caused mainly by the small dimensions of the transponder, the coil, and the integrated circuit chip or the encapsulated integrated circuit die. Normally, electronic elements used for manufacturing transponders are in the dimensions of some hundreds or tens micrometers. The wire used for making the coil is normally in the dimension of ten micrometers so that the diameter of the wire is comparable with the dimension of a human hair.

Before bonding or soldering the several components together they have to be brought in the right position. For this step in the manufacturing process a very precise and exact positioning is needed.

Normally, when producing such transponders or electronic devices the electronic circuits, integrated circuit dice or chips are fixed to a core before winding the latter. The fixing of the chip and the core have to be done with a great precision so that the chip and the core remain in the desirable position. This is of importance to secure that the chip is still exact in its position for locating the ends of the coil above the contact regions of the chip for a correct bonding and contacting after winding the coil around the core with an automatic winding machine.

U.S. Pat. Nos. 5,572,410 and 5,634,261 disclose a process avoiding this fixing process. In the respective described process the electronic circuit is held independently of the winding. First, a wire is guided above a first contact region of the held circuit. Then the coil is wound and after winding the coil the wire is placed above a second contact region of the circuit. Thereafter the wire ends are soldered to the contact regions. The process according to U.S. Pat. Nos. 5,572,410 and 5,634,261 has the disadvantage that the guiding and placing of the wire above the contact regions take place in another plane than that used for winding the coil. Therefore, either the wire has to be handled in three dimensions or the core has to be rotated. Anyway, the process has to take place in three dimensions. This is very elaborate and difficult to perform, resulting in a slow production speed. Furthermore, this kind of process results in high investment in the production line and the produced piece itself is relatively high priced.

SUMMARY OF THE INVENTION

Therefore, it is an object underlying the present invention to provide a process and a device for producing a transponder in an easier way, with less investment in the production line, and with lower production costs while preferably providing a faster production speed.

This problem is solved according to one exemplary embodiment of the invention in which there is provided a method to produce a transponder which comprises the following steps: positioning a coil comprising at least one coil end in a predetermined coil position and holding all of said coil ends in a respective holding position, and holding an integrated circuit chip comprising at least one contact pad in a chip fixture so that all of said coil ends of the coil that should be bonded to said chip are located on one side of corresponding contact pads of the chip, and bonding of the coil ends to the contact pads.

A device to produce a transponder according to the present invention comprises a first positioning means for positioning a coil comprising at least one coil end in a predetermined coil position and holding all of said coil ends in a respective holding position, a chip fixture for holding a chip comprising at least one contact pad so that all of said coil ends of the coil that should be bonded to said chip are located on one side of corresponding contact pads of the chip, and a bonding unit for bonding of the coil ends to the contact pads.

In a transponder that comprises an integrated circuit chip or an encapsulated integrated circuit chip with at least one contact pad and a coil with at least one coil end wherein the chip and the winding of the coil are positioned approximately in the same plane according to the present invention at least two of said coil ends cross each other between their respective bonding points on the contact pads of the chip and the coil.

The advantage of the present invention is that the method is clearly partitioned into the following discrete steps: First, the coil is wound which can be done in a separate process or in an integrated process step. Second, the wound coil and the chip are positioned in their holding means after winding the coil or supplying a pre-wound coil. The chip and the coil are positioned in a way that the at least one coil end is positioned on one side of corresponding contact pad(s) of the chip, preferably above corresponding contact pad(s) of the chip. Third, the bonding is done after the positioning step. At the end, the produced transponder is withdrawn of the holding means and of the device.

Every step of the process is clearly delimited from the other steps. This leads to a fast and quick production process, since every production step can be performed with maximum performance without any restrictions in respect to the preceding or the following production step, so that the transponder can be produced with a minimum of time consumption. This is the precondition for producing the transponder efficient and in a large quantity.

Further, there is no need to switch back and forth between the several steps of the process, e.g. positioning, winding and then again positioning, and between the several parts of the production device. This makes the handling relative simple and easy.

Further, the coil and the chip can easily be positioned approximately in the same plane or in parallel planes during the production. So, a very flat transponder can be produced without the need of a later bending of the chip-coil arrangement and all handling and production steps can be accomplished in one plane, which leads to an uncomplicated production line in comparison to a three-dimensional production requirement according to the prior art discussed above.

Moreover, with the method and the device according to the invention it is possible to bond also coils with only one end, meaning that only one end of the wound wire is bonded to the chip. The second end of the wound wire might be a free end. This free end is wound, but not contacted to the chip, so this kind of coil might be similar to an electric antenna like a monopole antenna. Such a coil could only be used to send or receive data but not energy, because in such antenna no voltage can be induced for creating a current in the coil and wire, respectively.

It is clear that also coils with more than two coil ends can be used in the process and handled by the device according to the present invention. Then not all coil ends have to be contacted to the contact pads of the integrated circuit chip, but can be. The coil ends not bonded to the chip can stay as free coil ends or be connected to a second chip, etc . . . .

The chip fixture for holding the integrated circuit chip in his determined position can work with vacuum so that the chip is sucked in its position. Like a nozzle of a vacuum cleaner an opening can be positioned under a specially formed holding mould for the chip in the determined chip position wherein the opening is smaller than the mould and the chip. The chip is then fixed in its position as long as the vacuum exists.

A further advantage of the invention is that a coil with crossed coil ends can be used or integrated in the process. This avoids an unwinding of the wire of the coil during production without any further means, because the ends of the coil are pulled in the direction to the coil. Further, this feature secures the winding also for pre-wound coils.

In a preferred embodiment of the present invention wherein all of said coil ends are held in a first holding position, said chip fixture wherein said chip is loaded gets moved from a chip loading position to a chip bonding position and/or at least one of said coil ends gets moved from its respective first holding position into a respective second holding position by a wirecatcher so that all of said coil ends of the coil that should be bonded to said chip are located on one side of corresponding contact pads of the chip.

In case the coil and the chip or the encapsulated integrated circuit die could not be directly positioned relative to each other so that the coil ends are positioned on one side, preferably above the contact pads of the chip, the above further process is performed so that the coil ends are positioned above the contact pads. As described, this can be done by moving the chip into the bonding position where the contact pad(s) of the chip is/are located under the corresponding coil end(s) and/or by catching the coil end(s) with a wirecatcher and moving the coil end(s) to be located above the corresponding contact pad(s). For reasons of process economy it may be useful to insert this additional step, since the exact positioning can be achieved with less effort and with less technical complexity. Furthermore, a faster positioning can be realised and the accuracy can be elevated.

As indicated, it is further possible to combine these two possibilities of positioning the coil ends above the contact pads of the chip. Therewith the positioning can be speeded up in addition, since each positioning possibility can be kept as simple as possible. Therefore, this combination is preferred according to the present invention.

Moreover, handling the positioning in a separate process step has the advantage that the device parts can be optimised for this kind of wire handling. The handling tool can achieve a high accuracy and speed merged together with relative low costs of investment.

The chip fixture can be formed as a kind of slide on which the chip is held. The slide can be moved very quickly forward and backward. The position of the slide and with it the position of the chip can be reached with high accuracy. A plurality of such chip fixtures can be arranged on a turntable or a kind of merry-go-round or as a turning arms or the like to be positioned at manufacturing or mounting stations corresponding to the discrete manufacturing steps.

According to the present invention, preferably a coil is positioned and held in a coil holder, a first and a second coil end are held in a first and a second wire holder, respectively, at its respective first holding position, the integrated circuit chip is positioned in the chip fixture and moved into the vicinity of the coil so that the first contact pad of the chip is positioned under the first coil end, the second coil end is caught and repositioned and stretched above a second contact pad of the chip with a wirecatcher and the second coil end is fixed in a third wire holder at its respective second holding position, after which the first coil end is bonded to the first contact pad and the second coil end is bonded to the second contact pad.

In this preferred embodiment, the coil holder might be optimised for holding coils with free coil ends. Further, the coil ends are attached in special wire holders to avoid the indefinite positioning and movement of the coil ends.

Preferably the first coil end is-held by the first wire holder and the chip is moved below the coil end and into the vicinity to the coil. So the chip and the coil are relatively close together so the whole workpiece is small. The second coil end is moved with a wirecatcher above the chip and its contact pad. In this preferred embodiment the two possibilities of moving the coil ends into their bonding position above the contact pads of the chip are combined. The advantage of this combination is that production speed can be increased.

Only after both coil ends are in their bonding position the chip and coil are bonded together. Thereafter, the workpiece has not to be moved back into the wire handling position for another wire handling step. This leads to a clear separation of the process steps.

Further preferably, according to the invention the coil holder for positioning and holding the coil has a top part which is covered with a synthetic coating.

The coating of the inner side of the top part of the coil holder with a synthetic material or with plastics secures that the coil gets released easy of the top part when the transponder is finished and has to be plundered. The coating avoids sticking of the coil in the coil holder. In addition the inner side of the bottom part of the coil holder can also be covered. As an example, a polytetrafluorethylene material like teflon is used as coating. Thereover, layering the lower portion of the top part of the coil holder with a synthetic and non-conductive material has the further advantage that the finished transponder can be tested in the test station without releasing it from the coil holder. Plastic materials are best suited for this cover.

Preferably, according to the invention the first coil end gets stretched using a tension arm during and/or after the chip fixture is moving from the chip loading position to the chip bonding position.

The tension arm guarantees that the coil end is stretched and so positioned straight above the contact pads of the chip. It further secures a good connection in the bonding point.

Further preferably, according to the invention the second coil end gets cut off after the wirecatcher caught the second coil end with a cutter so that the second coil end is cut between the wirecatcher and the second wire holder.

This cutting secures that the wire will not tear between the wirecatcher and the coil in which case either the production line would have to be stopped and a manual positioning of the second wire end would have to be performed, if possible at all, or if no manual positioning is possible or desired—the currently produced transponder will not function and be discarded in a later functionality test.

Preferably, according to the invention the coil ends get crossed between the bonding points where the coil ends are bonded to the contact pads of the chip and the coil.

Such a crossing secures that the coil will not unwind. This feature is preferred for both, the production of a transponder with an already finished coil that is delivered to the production line according to the present invention, and the production of a transponder wherein the coil is wound during the production on the production line according to the present invention, as set out in the following and further below in connection with the exemplary elucidated preferred embodiment of the invention that is shown in the figures.

Preferably, according to the invention claims a wire gets held as a first coil end in a first wire holder, the wire gets wound to a coil in a coil holder using a winding tool, and the wire gets held as a second coil end in a second wire holder.

This preferred embodiment enables to very easily produce the coil during the assembly of the transponder and secures that the coil is appropriately positioned in a coil holder that is used in the production line according to the present invention. Further, such a winding according to the present invention can be performed basically in one plane even if the coil would be needed in another plane, i.e. in a perpendicular plane, during the production of the transponder, since it would easily be possible to reposition the coil holder into another plane after the winding is performed and before the coil is fixed to the chip, i.e. before the coil ends are bonded to the contact pads of the chip.

In a preferred embodiment of the method according to the invention comprises the steps: positioning of a turntable with at least a winding position and a wire handling position into the winding position in which the coil is wound by a winding tool, and turning the turntable from the winding position into the wire handling position wherein the winding tool is not moving with the turntable causing that wire that is being supplied from the winding tool is received by a wire holder and forms simultaneously an end coil end of a first coil and a start coil end of a succeeding second coil in their respective first holding position.

Correspondingly, an embodiment of the device according the invention comprises a turntable with at least a winding position and a wire handling position, a winding tool for winding the coil which is fixed above the winding position of the turntable, wherein the winding tool comprises a flyer leading the wire and rotating around a coil holder, the wire-catcher is fixed above the wire handling position of the turntable, and turning of the turntable from the winding position into the wire handling position wherein the winding tool is not moving with the turntable causes that wire that is being supplied from the winding tool is received by a wire holder and forms simultaneously an end coil end of a first coil and a start coil end of a succeeding second coil in their respective first holding position.

According to the invention a turntable with at least a winding position and a wire handling position is used. The turntable can also comprise a bonding position and a plundering position in which the fabricated assemblies or transponders are withdrawn of the turntable. The turntable further comprises several equal parts in which the coil and the chips are held. The advantage is that several components or half-finished products or transponders in different states can be handled, i.e. one per production state.

A preferred example of a turntable consists of four stations for producing the transponder. Each station is in a different position. While a first transponder is finished and will be plundered from the turntable, a second transponder is in the bonding station to be bonded. A third transponder is at this time in the wire handling position in which the first contact pad of the chip is moved to be positioned under the first coil end and thereafter the second coil end is positioned above the second contact pad of the chip. At this time in the first station the wire is wound with a winding tool to a coil held in a coil holder. One advantage of this is that four transponders can be produced "simultaneously". Therewith the plurality of produced pieces of transponders can be increased.

Another advantage is that the wire can be supported continuously to the winding tool and the wire is positioned automatically in the next free wire holder for holding the coil ends in their right respective first holding position. The wire never has to be handled manually and it is possible to have a continuous process flow.

BRIEF DESCRIPTION OF THE DRAWINGS

All different aspects of the present invention as set out above and further elucidated below might be combined in any way. The accompanying drawings, which are incorporated in and constitute a part of this specification, illustrate an exemplary embodiment of the invention and, together with the general description of the invention given above and the detailed description of the exemplary embodiment given below, serve to explain the principles of the invention, wherein.

DETAILED DESCRIPTION OF THE INVENTION

Figure 1:
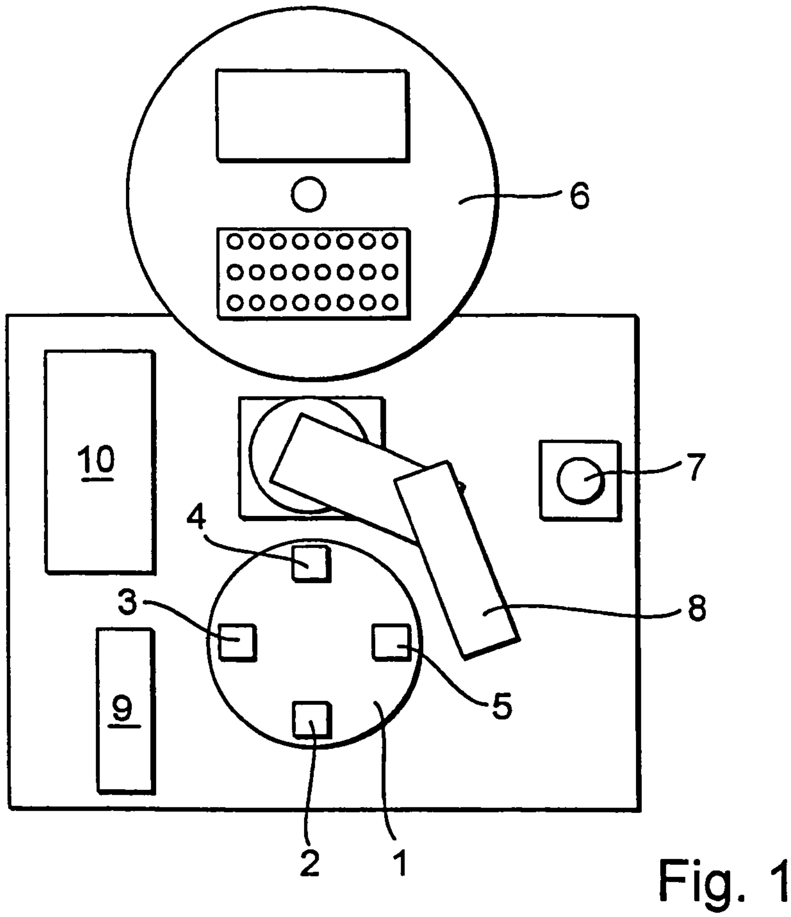
FIG. 1 shows a schematic principal view of a device to produce a transponder according to the present invention.
Figure 3:
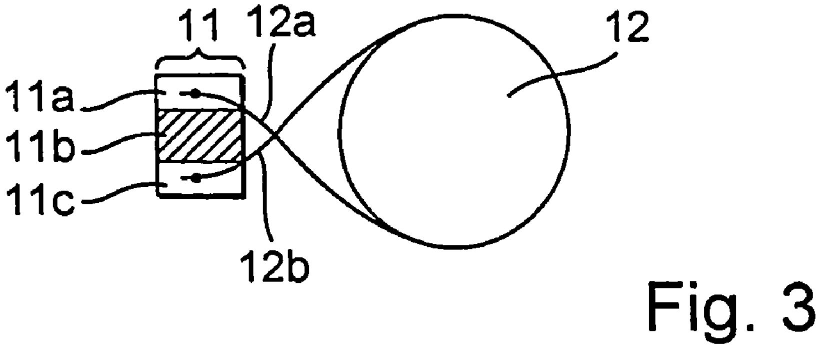
FIG. 3 shows a transponder according to the present invention.

FIG. 1 shows a typical production line according to the present invention that produces passive RFID transponders, which consists of a coil 12, e.g. made out of isolated copper wire with typical dimensions such as a diameter of 0.01-0.15 mm and a microchip 11 comprising an encapsulated electronic integrated circuit, as shown in FIG. 3. According to the present invention, the coil 12 is wound and then bonded to the chip 11 at two points. Thereafter, the production line tests the functionality of a produced transponder and then picks and places it onto a tray or onto various kinds of materials for encapsulation.

In particular, the production line comprises a turntable 1 with a winding station 2, a chip loading/wire handling station 3, a bonding station 4 and a plunder station 5. Basically, these stations are predetermined positions of the turntable 1 at which a respective operation is carried out. The turntable 1 comprises four coil and chip holders that are brought to the different stations by turning the turntable 1 in a clockwise direction. At each station a different production step is performed, beginning with the coil winding and ending with the plundering so that transponders can be manufactured in a particular easy and fast way.

To secure such a rapid production various additional devices are arranged around the turntable 1 to ensure that a robot 8 can pick the readily manufactured transponders at the plunder station 5, bring them to the test station 7 and thereafter to a round table 6 to place them onto the tray or various kinds of materials for encapsulation in a fast manner. These components are in particular a (not shown) coil winding tool that is arranged above the winding station 2, a chip feeder 9 and a module chip feeder 10 that are arranged in the vicinity of the chip loading/wire handling station 3. These components deliver the materials needed to produce the transponders, namely the wire needed to produce the coils and the chips to which the coils are bonded, respectively. The chip feeders 9 and 10 are standard devices, which comprise a small robot arm that picks up the chip and places it in a chip fixture that is described in detail further below. The winding tool that is shown in detail in FIGS. 4 and 5 is also elucidated further below.

Figure 2:
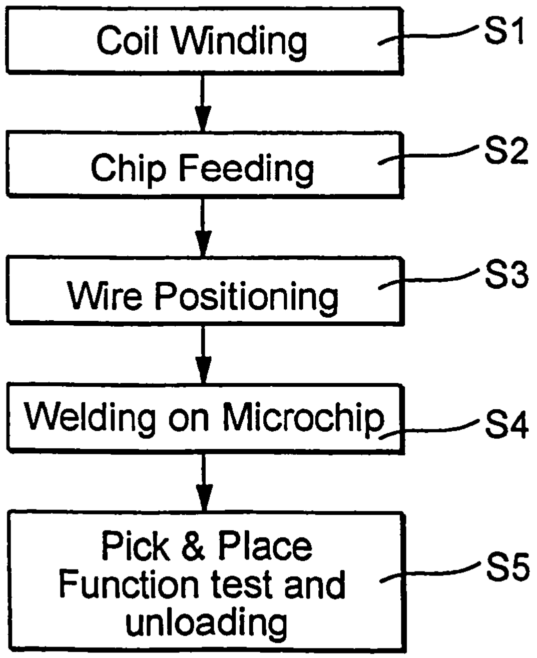
FIG. 2 shows a flowchart of the process steps to produce a transponder according to the present invention.

FIG. 2 shows the principal process that is carried out in the production line according to the present invention. In a first step S1 a coil winding is performed at the winding station 2. Alternatively, an already finished, i.e. pre-wound, coil could be supplied at this state. Then, the turntable rotates 90° in a clockwise direction to bring the coil to the chip loading/wire handling station 3 in which a chip feeding is performed in a second step S2. After the chip feeding a third step S3 follows in which a wire positioning is performed while the coil and the chip are still in the chip loading/wire handling station 3. During the wire positioning the wire and the chip are positioned relative to each other so that in a following step S4, which is performed after the turntable again rotated about 90° in a clockwise direction, the bonding of the wires to the microchip, i.e. a welding on microchip, can be performed. After the welding in step S4 the turntable again rotates about 90° so that the transponder is delivered from the bonding station 4 to the plunder station 5 and a pick and place, function test and unloading can be performed in step S5. This is performed by means of the robot 8, the test station 7 and the round table 6, i.e. the robot arm 8 picks the manufactured transponder, delivers it to the test station 7 and after the test to the round table 6 where it is placed onto a tray or one of various kinds of materials for encapsulation.

FIG. 3 shows the transponder according to the present invention that is manufactured in the production line according to the present invention in more detail. The transponder comprises a chip 11 with a first connection pad 11*a*, an encapsulated integrated circuit 11*b* and a second connection pad 11*c*, and a coil 12 with a first coil end 12*a* and a second coil end 12*b*. The first coil end 12*a* of the coil 12 is bonded to the first connection pad 11*a* of the chip 11 and the second coil end 12*b* of the coil 12 is bonded to the second connection pad 11*c* of the chip 11. The coil ends cross each other between the bonding points where the coil ends are bonded on the contact pads of the chip and the actual coil 12. This crossing ensures that the wound coil will not unwind during the production, in particular if finished coils are delivered to the turntable 1, or after the production, in particular before an encapsulation. The transponder according to the present invention comprises the winding of the coil and the chip substantially in the same plane.

Figure 4:
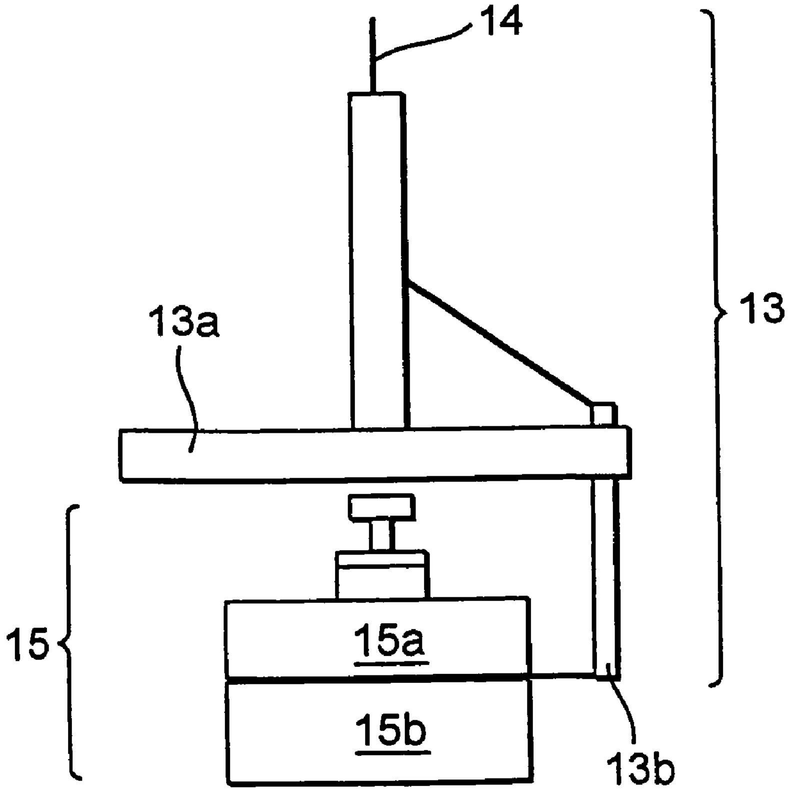
FIG. 4 shows a winding station used in the device to produce a transponder as shown in FIG. 1.
Figure 5:
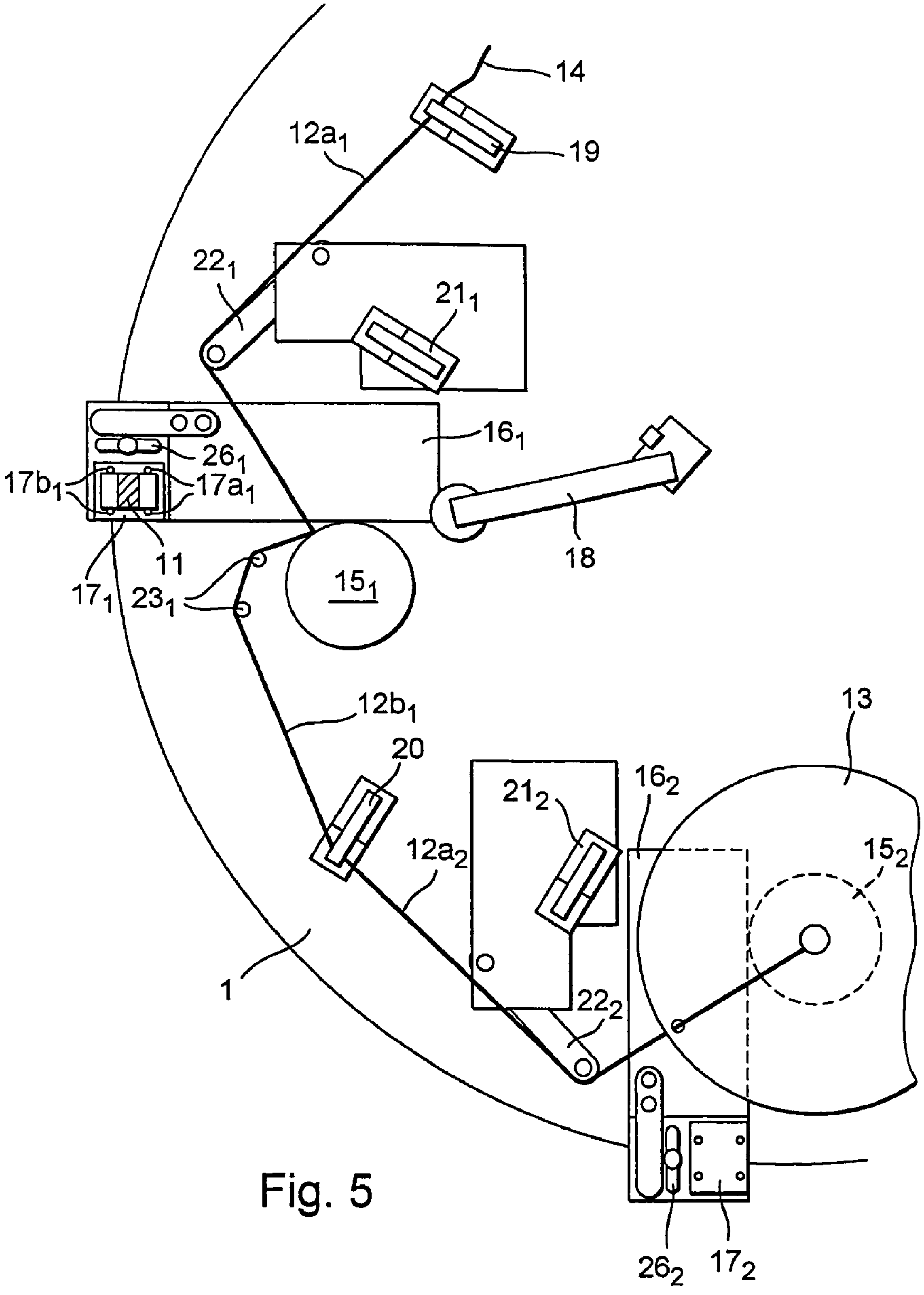
FIG. 5 shows a part of the device to produce a transponder as shown in FIG. 1, which serves to elucidate the coil winding and an initial state of the chip feeding and wire positioning according to the present invention.

FIG. 4 shows the winding tool that is positioned above the winding station 2 of the turntable 1 in more detail. The winding tool 13 comprises a flyer 13*a* and a wire guide 13*b*. A copper wire 14 arrives at the central axis of the flyer 13*a* at the winding tool 13 and is guided through the wire guide 13*b* to a position on the outer circumferential area of the flyer 13*a*. Further, the wire 14 is guided from the top to the bottom to be supplied to the turntable 1, in particular to a coil holder 15 that comprises a top part 15*a* and a bottom part 15*b*, which are arrange one upon the other with a small gap in-between in which a coil is wound by rotating the winding tool around its central axis when the coil holder is located underneath the winding tool 13 and the central axis of the coil holder 15 and the-central axis of the winding tool 13 are aligned with each other.

The positioning of the coil holder 15 underneath the winding tool 13 and the guiding of the wire 14 to the coil holder 15 and from the coil holder 15 is elucidated in FIG. 5, which shows the coil winding station 2 and the chip loading/wire handling station 3 in more detail. In FIG. 5 an index 1 indicates a first assembly or manufacturing place and an index 2 indicates a second assembly or manufacturing place, which are in the following also referred to as working place. As stated above, the turntable 1 comprises four such working places which are respectively located underneath one of the assembly or manufacturing stations 1 to 4 and moved from station to station by turning the turntable 1 by 90°. All components with indices are therefore available four times on the turntable 1. All other components are uniquely available. In particular, the turntable 1 comprises four wire holders from which a first wire holder 19 and a second wire holder 20 are shown, which wire holders separate the working places, a robot arm 18 which is located above the chip loading/wire handling station 3 to perform a part of the wire positioning, and the winding tool 13 which is arranged above the winding station 2. The robot arm 18, which is in the following referred to as wirecatcher 18, and the winding tool 13 are not moving when the turntable 1 rotates.

Each of the working places comprises a slide 16 with a chip fixture 17, a third wire holder 21, a tension arm 22, and guiding pins 23 additionally to the fixed bottom part 15*b* of the coil holder 15. The chip fixture comprises four guiding pins, namely two first guiding pins 17*a* arranged to guide a wire for positioning above the first contact pad 11*a* of a chip 11 loaded into the chip fixture 17 and two second guiding pins 17*b* arranged to guide a wire to be located above the second contact pad 11*c* of the chip 11 loaded into the chip fixture 17. The chip 11 might be held in a predetermined position within the chip fixture 17 by way of a vacuum.

In the shown state the winding of a coil at the winding station 2 at which a second working place is located, i.e. index 2, is not started and a chip 11 is already loaded into the chip fixture 17 of a first working place, i.e. index 1, where the winding of the coil was complete before the turntable 1 was turned by 90°, in other words, the state is shown in which the turntable was just rotated by 90° in a clockwise direction, the spinning of the succeeding coil is not yet started, but the chip 11 is already loaded into the chip fixture 17 at the chip loading/wire handling station 3. In this state the guiding of the wire prior to the wire positioning according to the present invention can easily be seen. The end of the wire 14 is held by a first wire holder 19 and fed along a tension arm 221 of the first working place as a first coil end 12*a*1 within the first working place to the first coil holder 151 of the first working place. The wire 14 with which the coil is wound leaves the coil holder 151 of the first working place and is guided along guiding pins 231 of the first working place as a second coil end **12*b*1 of the coil 12 within the first working place to a second wire holder 20. The same wire guiding is performed for every one of the four working places in this position. As can be seen in FIG. 5, the wire holders that are separating the working places serve simultaneously as second wire holder for holding the second coil end 12*b* and as first wire holder for holding the first coil end 12*a*** of the succeeding coil.

After the winding of a coil is finalised the two guiding pins 23 of a working place are raised from a buried position so that the wire that comes out of the spinning winding tool is not guided into the coil holder, but with a simultaneous rotation of the turntable 1 into the next wire holder that is separating the working place in which the winding of a coil is just finished from the succeeding working place, i.e. the working place in which the next coil will be wound.

For the loading of the chip 11 into the chip fixture 17 the slide 16 of a working place is positioned so that the chip fixture 17 is in an outermost position with respect to the turntable 1. Further, in the shown initial state of the wire handling the wirecatcher 18 is positioned to be directed to the centre of the turntable 1 so that the guiding of the wire is not disturbed.

Figure 6:
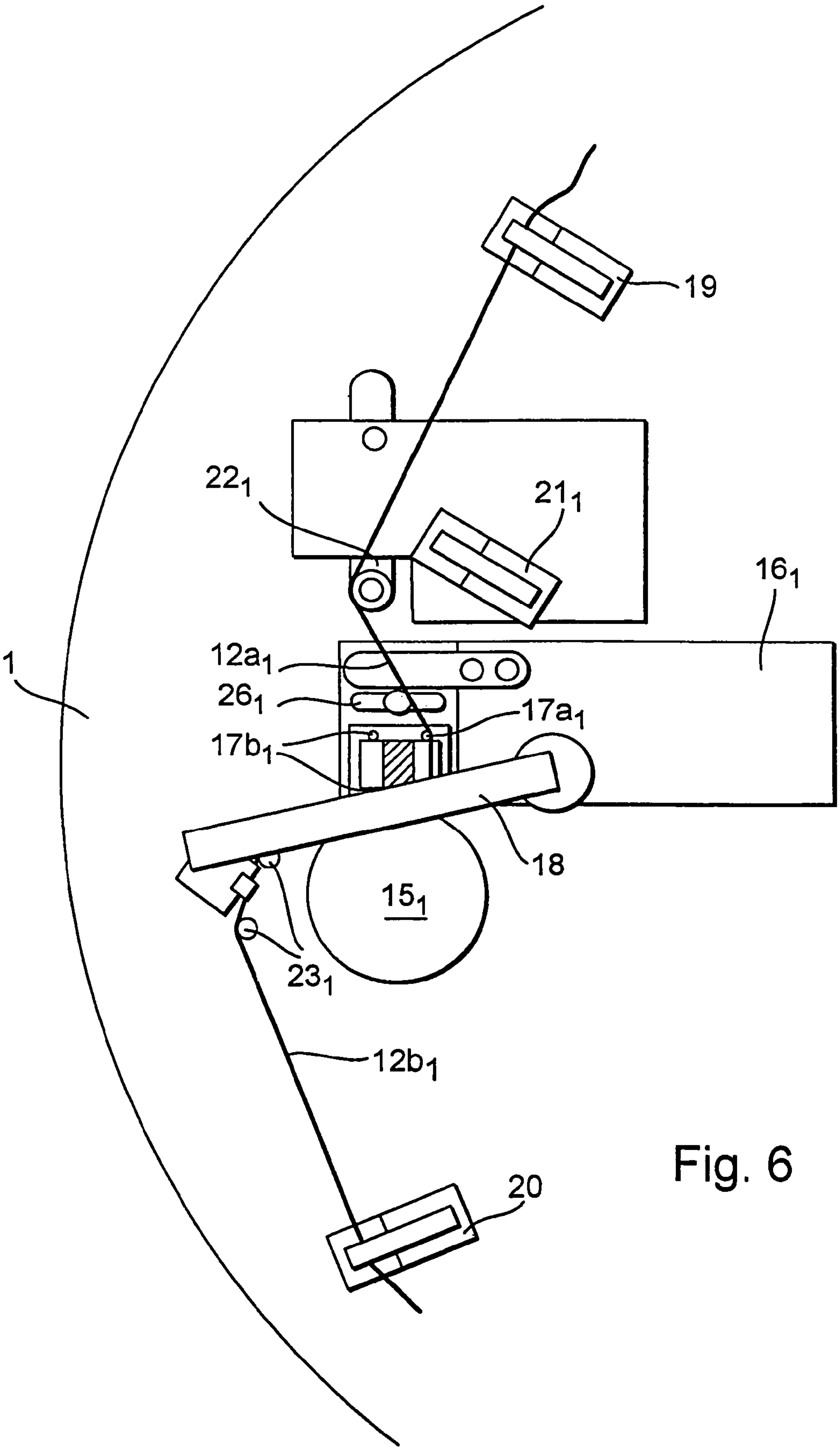
FIG. 6 shows a part of the device to produce a transponder as shown in FIG. 1, which serves to elucidate a first intermediate state of the wire positioning according to the present invention.

FIG. 6 shows a first intermediate state of the wire handling in which the slide 161 is moved inwardly with respect to the edge of the turntable 1 so that the first guiding pins **17*a*1 of the chip fixture 171 catch the first coil end 12*a*1 which causes that the wire of the first coil end 12*a*1 that is in a tensed state due to the pressure of the tension arm 221 is stretched against both first guiding pins 17*a*1 and located above the first contact pad 11*a* of the chip 11 which is loaded in the chip fixture 171. Further, in this state the wirecatcher 18 is turned to grab the wire of the second coil end 12*b*1 between the two guiding pins 231 of the first working place. To catch the wire in this position the wirecatcher 18 performs approximately a 180° turn in a counter-clockwise direction from its initial position in which the wirecatcher 18 is directed inwardly with respect to the turntable 1. In the first intermediate state the wire-catcher is directed outwardly with respect to the turntable 1. Of course, the wirecatcher might also move 180° in a clock-wise direction to catch the wire 14 of the second coil end 12*b*1 in the shown position. The moving direction of the wire-catcher 18** basically depends on its design and on the design of the whole manufacturing line.

Figure 7:
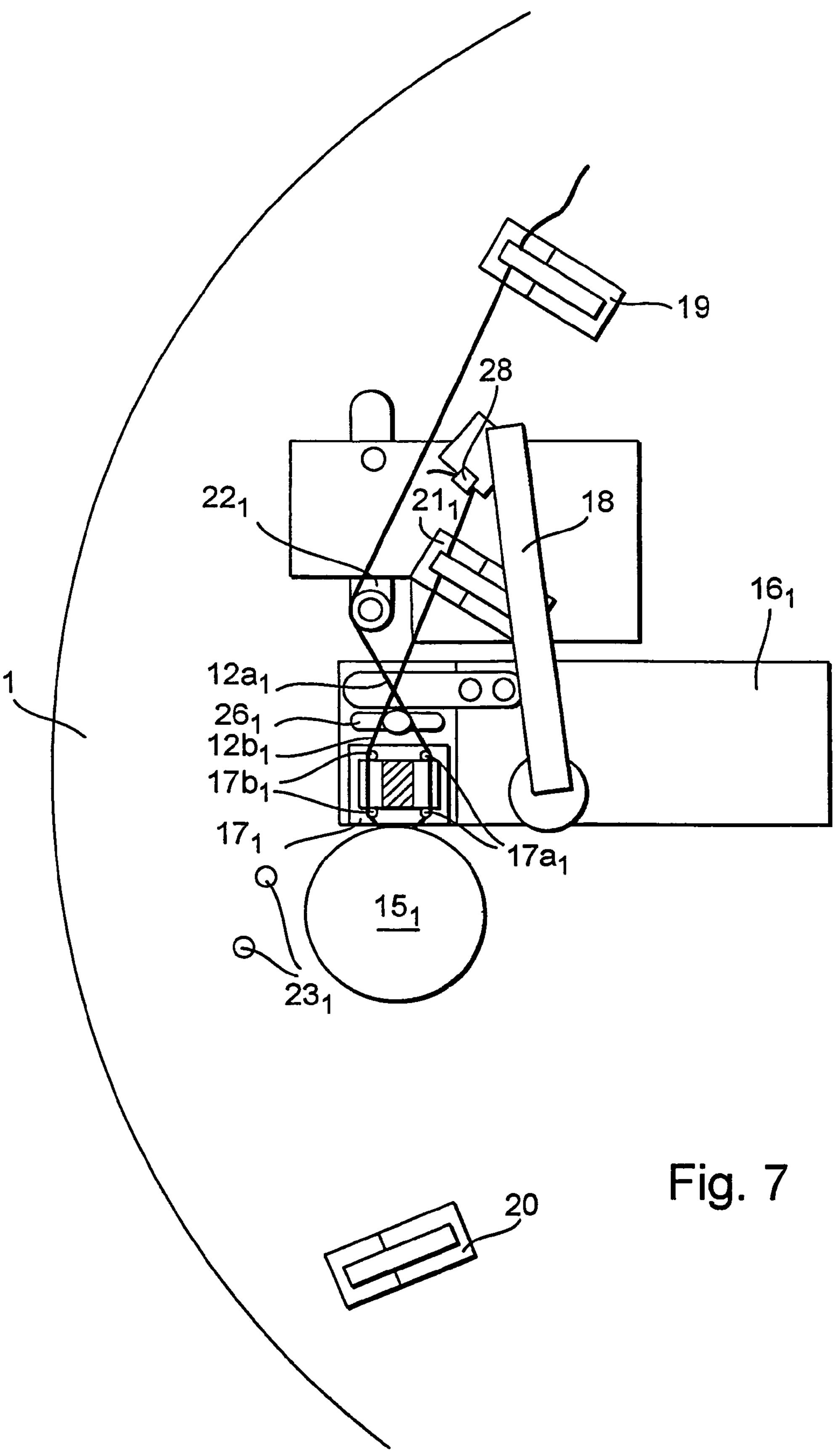
FIG. 7 shows a part of the device to produce a transponder as shown in FIG. 1, which serves to elucidate a second intermediate step of the wire positioning according to the present invention.

FIG. 7 shows a second intermediate state of the wire handling according to the present invention. To reach this second intermediate state the wirecatcher 18 moves approximately 90° in a clockwise direction in respect to the first intermediate state. The result of this move is that the wire of the second coil end **12*b*1 is stretched against the second guiding pins 17*b*1 of the chip fixture 171 to be located above the second contact pad 11*c* of the chip 11 loaded in the chip fixture 171 and that the second coil end 12*b*1 is further guided into a third wire holder 211 that is arranged to receive a wire in this position. During the move from the first intermediate state to the second intermediate state the wire is caught by a gripper 28 that is attached at the wirecatcher 18. The wire is kept stretched by the fact that due to the position and the geometry of the wire catcher 18 the wire is moving away from the chip fixture 171 and by the fact that the wire is sliding in the gripper 28 of the wire-catcher 18. The strength with which the gripper 28 is holding the wire is determined by a regulated air pressure applied to the gripper 28. Before moving the wire with the wirecatcher 18 from the first intermediate state to the second intermediate state it is cut between the wirecatcher 18 and the second wire holder 20**.

Figure 8:
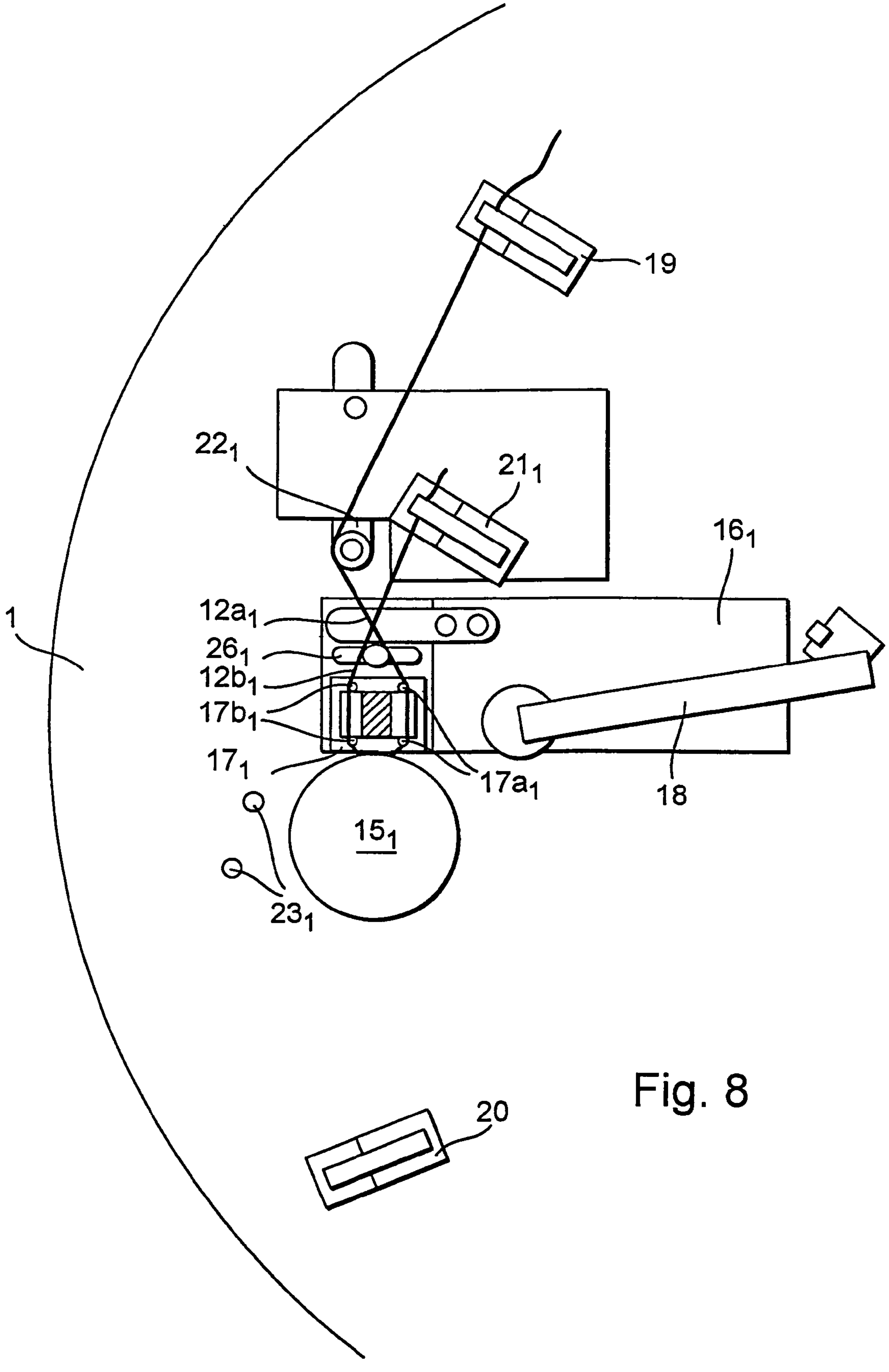
FIG. 8 shows a part of the device to produce a transponder as shown in FIG. 1, which serves to elucidate a final state of the wire positioning according to the present invention.

FIG. 8 shows the final state of the wire handling in which the wirecatcher 18 moved back to its initial position by another approximately 90° turn in a clockwise direction and the third wire holder 211 holds the wire of the second coil end **12*b*1 in a tensed state. In this final state both coil ends 12*a*1 and 12*b*1 of the coil 121 are properly positioned above the contact pads 11*a*, 11*c* of the chip 11 loaded into the chip fixture 171**.

Figure 9:
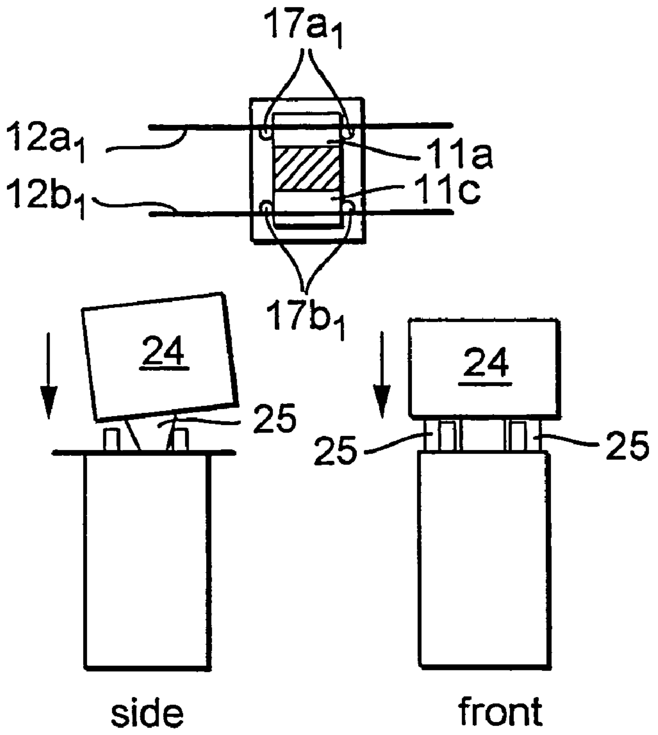
FIG. 9 shows a principal diagram elucidating the welding of the coil wires to the (micro-) chip.

The turntable 1 then gets rotated by 90° in a clockwise direction so that the properly aligned transponder parts, i.e. the chip 11 and the coil 121, are moved into the bonding station 4. FIG. 9 elucidates the bonding that is performed in this position schematically. The bonding itself is performed in a generally known manner, however, it should be noted that according to the present invention the bonding of both coil ends is performed simultaneously in order to facilitate a faster production. As described above, the first coil end **12*a*1 is positioned above the first contact pad 11*a* of the chip 11 and the second coil end 12*b*1 is positioned above the second connection pad 11*c* of the chip 11. The bonding head 24 moves downwards until its diamonds 25 hit the contact pads 11*a* and 11*c* of the chip 11. In reality the diamonds 25 of the bonding head 24 hit the wires of the first coil end 12*a*1 and the second coil end 12*b*1** and weld them onto the respective pad under a specific pressure and time in case of a thermal compression bonding.

After the bonding the wires might be cut by a cutter 261 that is provided on the slide 161 more or less directly behind the bonding points. Thereafter the wire ends in the first and third wire holders 19, 211 are removed, e.g. by opening the wire holders and supplying an air pressure to blow the wire ends away or providing a vacuum to suck the wire ends away.

Figure 10:
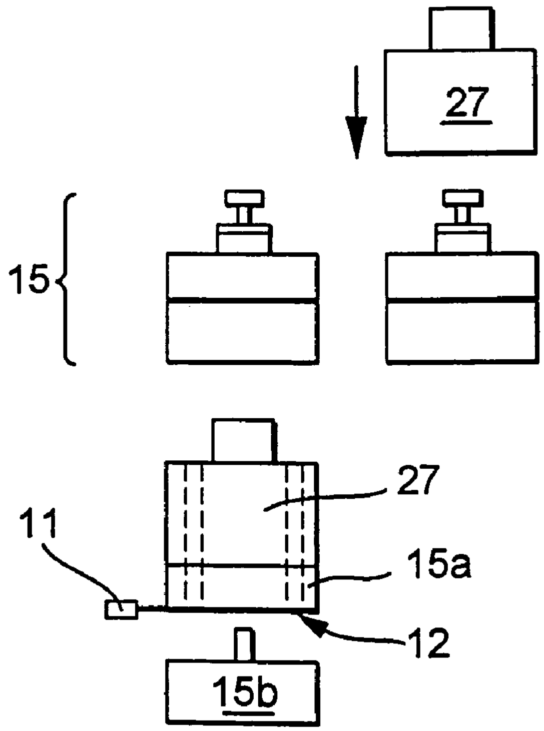
FIG. 10 shows a principal diagram elucidating the unloading of the transponder according to the present invention from the device to produce a transponder according to the present invention as shown in FIG. 1.

Then, the turntable 1 is again rotated by 90° in a clockwise direction so that the finished, but still loaded transponder reaches the plunder station 5. In the plunder station 5 a robot tool 27 of the robot 8 moves downwards and docks with the top part **15*a* of the coil holder, preferably while connecting air channels that might be used to create a vacuum in the top part 15*a* of the coil holder 15, as shown in FIG. 10. The robot 8 moves the robot tool 27 upwards and separates the two halves of the coil holder 15. Due to the tendency of the transponder 11, 12 to stick in the coil holder 15 the inner part of the coil holder 15 is coated with teflon. The vacuum created in the top part 15*a* makes it possible to hold the transponder 11, 12, since the coil 12 is sucked on the top part 15*a* of the coil holder 15 through the air channels. The robot 8 moves outwards to the testing station 7 where the transponder 11, 12 is tested. For testing the transponder 11, 12 without releasing it from the coil holder 15 the top part 15*a* is layered with a plastic material. Otherwise, the transponder 11, 12 has to be released from the coil holder 15 and to be set on a metal free testing plate. If the transponder 11, 12 is positively tested, the robot 8 moves to the round table 6 and unloads the transponder 11, 12 in an appropriate position. If transponder 11, 12 is negatively tested, the robot 8 moves the transponder 11, 12 to a reject bin and releases it. As mentioned above, the bottom part 15*b* of the coil holder 15 is fixed to the turntable 1**.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. Method to produce a transponder, comprising:

position a coil comprising first and second coil ends in a predetermined coil position and holding said coil ends in a first holding position with a first and a second wire holder;

feeding a chip comprising first and second contact pads to a chip fixture after positioning the coil in the predetermined position;

moving said chip fixture in which said chip is loaded from a chip loading position to a chip bonding position into the vicinity of the coil so that the first contact pad of the chip is positioned under the first coil end;

catching the second coil end and repositioning and stretching the second coil end above the second contact pad of the chip with a wirecatcher and fixing the second coil end in a third wire holder at a respective second holding position; and bonding the first coil end to the first contact pad and the second coil end to the second contact pad.

2. Method to produce a transponder according to claim 1, further comprising stretching the first coil end using a tension arm during, or after, the chip fixture is moving from the chip loading position to the chip bonding position.

3. Method to produce a transponder according to claim 1, further comprising cutting off the second coil end after the wirecatcher has caught the second coil end so that the second coil end is cut between the wirecatcher and the second wire holder.

* * * * *

UNITED STATES PATENT AND TRADEMARK OFFICE

CERTIFICATE OF CORRECTION

PATENT NO. : 7,610,675 B2
APPLICATION NO. : 10/831209
DATED : November 3, 2009
INVENTOR(S) : Hansson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Twelfth Day of October, 2010

David J. Kappos
*Director of the United States Patent and Trademark Office*